United States Patent Office.

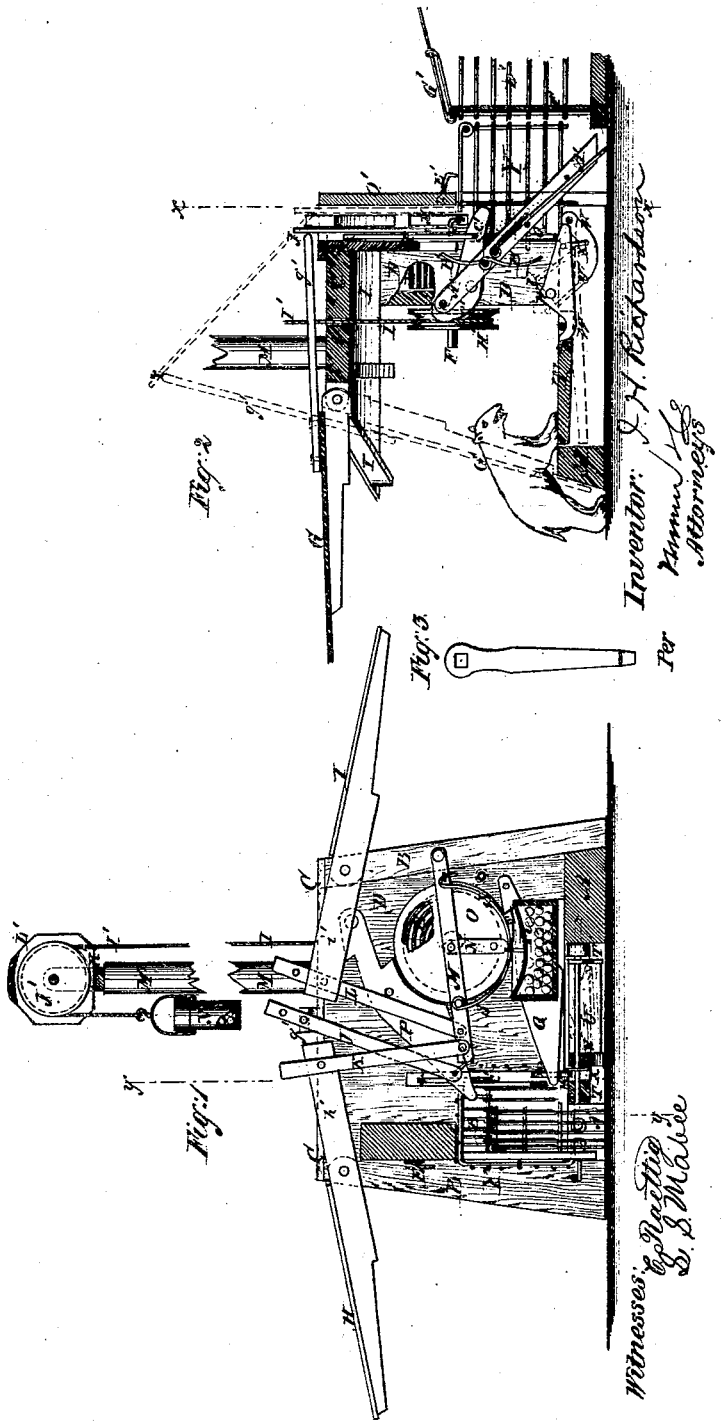

JAMES H. RICHARDSON, OF WESTPORT, MISSOURI.

Letters Patent No. 107,292, dated September 13, 1870.

IMPROVED ANIMAL-TRAP.

The Schedule referred to in these Letters Patent and making part of the same

*To all whom it may concern:*

Be it known that I, JAMES H. RICHARDSON, of Westport, in the county of Jackson and State of Missouri, have invented a new and useful Improvement in Animal-Trap; and I do hereby declare that the following is a full, clear, and exact description thereof, which will enable others skilled in the art to make and use the same, reference being had to the accompanying drawing forming part of this specification.

Figure 1 is a detail sectional view of my improved trap, taken through the line $x$ $x$, fig. 2.

Figure 2 is a detail sectional view of the same, taken through the line $y$ $y$, fig. 1.

Similar letters of reference indicate corresponding parts.

My invention has for its object to furnish an improved trap for catching game and other animals, and which shall be reliable and effective in operation, and at the same time self-setting; and It consists in the construction and combination of the various parts of the trap, as hereinafter more fully described.

A is the bottom of the trap, to which, at its rear edge, is attached a vertical frame, B.

C is the top of the trap, the rear part of which is securely attached to the top of the vertical frame B, and which is made smaller than the bottom A, as shown in fig. 2.

To the upper part of the vertical frame B, beneath the top C, is attached a box or casing, D, which incloses the coiled spring E.

One end of the coiled spring E is secured to a bolt passing through and secured to the sides of the box or casing D, and its other end is secured to a shaft, F, that revolves in bearings in the sides of the box or casing D.

G is the front, and H I are the end shutters, which are pivoted or hinged at their upper edges to the top C, and the adjacent edges of which are made inclined, so that, when closed down against the edges of the bottom A, the said shutters may be inclined something like a roof.

$g'$ $h'$ $i'$ are levers formed upon or attached to the shutters G H I, the three free ends of which, when the shutters are raised, nearly meet, as shown in fig. 1.

To the free ends of the levers $g'$ $h'$ $i'$ are detachably and adjustably pivoted the upper parts of the connecting-bars J K L, the lower ends of which are pivoted to the free ends of the lever M, the other end of which is pivoted to the post of the vertical frame B, and to its middle part is pivoted the upper end of the bar N, the lower end of which is pivoted to the wheel O, attached to the outer end of the shaft F by means of a crank-pin, several holes being made in said wheel at different distances from its center, so that, by adjusting the position of the said pin, the shutters G H I may be raised more or less when the trap is set.

Upon the edge of the wheel O is formed a cam or projecting tooth, $o'$, which, at each half revolution of the wheel O and shaft F, catches upon a notch in the triggers or levers P Q, to lock the shutters G H I alternately open and closed.

The levers P Q are pivoted to the vertical frame B, or to the side of the box D, the one above and the other below the wheel O, and are made exactly alike, that is to say, with two holes for the pivoting-screws, with a notch upon their upper edges, and another notch upon their lower edges, and with the forward part of their lower edges, that rest upon the trip-levers, straight, as shown. This enables the levers to be both made with the same tool, and enables them to be exchanged, should they become worn.

R is a weight-box, provided with a detachable cover, and hung, by means of the semicircular rod S, from the lever M, to partially balance the shutters G H I. One end of the rod S is pivoted to the lever M, near one end, and its other end has a hook formed upon it, which hooks into a staple attached to the said lever M, near its other end. By this arrangement, as the shutters are lowered, the weight moves back toward the pivoted end or fulcrum of the said lever M, to allow the shutters to be held more firmly closed, and, as the shutters are raised, the said weight moves toward the free end of the said lever M, to more evenly balance the said shutters.

T is the drop or trip platform, the rear edge of which is pivoted to the base frame of the trap, and the middle part of its rear side is cut away to obtain space for the movement of the bait-box U, which is made with rearwardly-projecting arms V, formed upon or attached to the ends of its bottom, the rear ends of which are pivoted to the same rod that pivots the platform T to the base frame of the trap.

W is a triangular lever, pivoted to the vertical frame B, and the upper edge of the forward arm of which is concaved, as shown in fig. 2, to receive a pin attached to the platform T, so that the lever W may be operated by the downward movement of the said platform. The rear arm of the lever W passes beneath the straight lower edge of the lower trigger or lever Q, so that the downward movement of the platform T will release the wheel O, and allow the shutters to drop or close, where they are held locked by the trigger or lever P catching upon the said wheel O.

The arms V of the bait-box U are connected with the lever W by a short connecting-rod, X, so that, as the platform T moves downward, it raises the open mouth of the bait-box against the bottom of the box D, so that the animals can never get at the bait. As the trap is again set, the bait-box U is again lowered to expose the bait, the mouth of the bait-box, when lowered, being about upon a line with the platform T.

Y is a passage way, made of wire or rods, and attached to the opening in the rear side of the trap, and which is closed by the wire drop-gates or doors A' B'.

The drop-gate A' is pivoted to the vertical frame B by a rod passing through holes in the upwardly-projecting side bars of the said gate A'. The drop-gate B' is pivoted to the upper part of the side bars of the gate A', and its upper end projects so as to rest against the rear side of the trap, so as to prevent the backward movement of the said gate, so that, should the caged animal succeed in raising the door A', he cannot open the door B', and escape through the trap.

C' is a lever, which is pivoted to the vertical frame B or box D of the trap, and the upper edge of the inner end of which is concaved, to receive a pin or rod attached to the upper ends of the side bars of the door A'. The outer end of the lever C' passes beneath the straight lower edge of the upper trigger or lever P.

By this construction, as the animal is caught by the descent of the shutters G H I, he sees a light through the passage way Y, and, seeking to escape, he rushes through said passage way, raising the doors A' and B', and finds himself in the wire cage D'. Should the animal hesitate or stop, as he is forcing his way past the doors A' B', the door B' drops upon him, and the sharp points upon its lower end prevent his return, and at the same time, by pricking him, cause him to go on.

The wire cage D' is secured to the passage way Y by a hook, E', pivoted to the frame-work of the trap.

The wire cage D' is provided with a sliding door, F', which, when the trap is detached from the cage, is inserted in the opening of said cage, and secured by the fastening G'.

To the inner end of the shaft F is attached a wheel, H', which is made in two parts, the inner part being made with a projecting circular shoulder for the cord I' to be wound upon, and a projection to receive and hold the said cord.

The cord I' passes up through a hole in the stationary top C of the trap, and passes over a pulley, J', the journals of which revolve in bearings in the forked end of the screw-bracket K'.

The pulley J' is provided with a case or plates, L', to keep the cord from getting out of the groove of said pulley.

The bracket K' may be screwed into the top of a post, M', secured to the top of the trap, or it may be screwed into the ceiling or frame of the room in which the trap is set.

To the end of the cord I' is attached a weight, N', so that the operating mechanism of the trap may be operated by the spring E, or by the weight N', or by the two in conjunction, as may be desired or convenient.

The operating parts at the rear side of the trap may be covered and protected by a board, O', notched to receive the passage way Y, and pivoted to the frame-work of the trap, so that it may be turned up out of the way to give convenient access to said parts when required.

It should be observed that one, two, or all three of the shutters G H I may be used as may be required or according to the character of the animal trapped for.

Having thus described my invention,

I claim as new and desire to secure by Letters Patent—

1. The combination of the base A, vertical frame B, box D, shaft F, coiled spring E, top C, shutters G H I, levers g' h' i', connecting-bars J K L, lever M, connecting-bar N, wheel O o', self-adjusting weight R S, levers or triggers P Q, platform T, bait-box U V, lever W, passage way Y, drop-doors A' B', lever C', and cage D', provided with a door, F', and fastening, G', with each other, substantially as herein shown and described, and for the purpose set forth.

2. The combination of the weight N', cord I', pulley J' K' L', and wheel H with the shaft and mechanism from which the shutters G H I are operated, substantially as herein shown and described, and for the purpose set forth.

JAMES H. RICHARDSON.

Witnesses:
  JOHN ENDRES,
  JAMES P. RIDGE.